United States Patent
Chae

(10) Patent No.: US 12,500,499 B2
(45) Date of Patent: Dec. 16, 2025

(54) DUAL-ROTOR MOTOR

(71) Applicants: HYUNDAI MOTOR COMPANY, Seoul (KR); KIA CORPORATION, Seoul (KR)

(72) Inventor: Min Ho Chae, Incheon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 203 days.

(21) Appl. No.: 18/375,821

(22) Filed: Oct. 2, 2023

(65) Prior Publication Data

US 2024/0380293 A1 Nov. 14, 2024

(30) Foreign Application Priority Data

May 11, 2023 (KR) .................. 10-2023-0061061

(51) Int. Cl.
*H02K 16/02* (2006.01)

(52) U.S. Cl.
CPC .................. *H02K 16/02* (2013.01)

(58) Field of Classification Search
CPC ...... H02K 16/02; H02K 19/103; H02K 1/246; H02K 7/116; H02K 21/021; H02K 2213/03
USPC ................................. 310/112, 114
See application file for complete search history.

(56) References Cited

U.S. PATENT DOCUMENTS

| | | | | |
|---|---|---|---|---|
| 6,563,246 B1 * | 5/2003 | Kajiura | ............... | H02K 21/029 903/952 |
| 6,924,574 B2 * | 8/2005 | Qu | ............... | H02K 21/12 310/112 |
| 7,253,548 B2 * | 8/2007 | Dooley | ............... | H02K 21/028 310/191 |
| 7,567,006 B2 * | 7/2009 | Ichiyama | ............... | H02K 21/029 310/156.55 |
| 8,089,191 B2 * | 1/2012 | Hao | ............... | H02K 21/028 318/538 |
| 8,536,752 B2 * | 9/2013 | Katsumata | ............... | H02K 21/028 310/156.01 |
| 9,601,952 B2 * | 3/2017 | Yoshikawa | ............... | H02K 1/2773 |
| 10,491,094 B2 * | 11/2019 | Imanishi | ............... | H02K 3/18 |
| 11,606,011 B2 * | 3/2023 | Zatorski | ............... | H02K 21/22 |
| 2007/0236095 A1 * | 10/2007 | Caiozza | ............... | H02K 23/68 310/154.49 |
| 2007/0273235 A1 * | 11/2007 | Kaizuka | ............... | H02K 21/029 310/156.16 |
| 2023/0311634 A1 * | 10/2023 | Chae | ............... | H02K 1/20 |
| 2023/0318421 A1 * | 10/2023 | Chae | ............... | H02K 16/02 310/114 |
| 2023/0318422 A1 * | 10/2023 | Chae | ............... | H02K 1/187 310/114 |
| 2024/0380293 A1 * | 11/2024 | Chae | ............... | H02K 16/02 |
| 2025/0007372 A1 * | 1/2025 | Chae | ............... | H02K 21/12 |

FOREIGN PATENT DOCUMENTS

JP 2004336915 * 11/2004

* cited by examiner

*Primary Examiner* — Ahmed Elnakib

(74) *Attorney, Agent, or Firm* — Lempia Summerfield Katz LLC

(57) ABSTRACT

A dual-rotor motor includes an inner rotor and an outer rotor sequentially disposed in a radial direction, a stator disposed between the inner motor and the outer rotor, and a variable reluctance core configured to vary a magnetic-path formed state of the stator according to physical displacement thereof.

14 Claims, 6 Drawing Sheets

DUAL-ROTOR MOTOR

CROSS-REFERENCE TO RELATED APPLICATION

This application claims priority to and the benefit of Korean Patent Application No. 10-2023-0061061, filed on May 11, 2023 in the Korean Intellectual Property Office, the entire disclosure of which is incorporated herein by reference.

BACKGROUND OF THE DISCLOSURE

1. Technical Field

The present disclosure relates to technology for the structure of a dual-rotor motor.

2. Description of the Related Art

A dual-rotor motor is a motor in which rotors are disposed on an inner side and an outer side of a stator. The dual-rotor motor is configured such that an inner rotor disposed on the inner side of the stator and an outer rotor disposed on the outer side of the stator rotate independently of each other.

In order to independently drive the inner rotor and the outer rotor, the stator includes slots formed in the inner circumferential surface and the outer circumferential surface thereof and includes coils wound in the slots.

The information disclosed in this Background of the Disclosure section is only to enhance understanding of the general background of the disclosure. The Background section should not be taken as an acknowledgement or any form of suggestion that this information forms the related art already known to a person of ordinary skill in the art.

SUMMARY OF THE DISCLOSURE

Therefore, the present disclosure has been made in view of the above problems. It is an object of the present disclosure to provide a dual-rotor motor capable of varying the connection state of magnetic paths thereof in order to reduce reluctance and increase inductance when an inner rotor and an outer rotor rotate at the same speed. The torque density thereof is thereby improved.

In accordance with the present disclosure, the above and other objects can be accomplished by the provision of a dual-rotor motor. The dual-rotor motor includes an inner rotor and an outer rotor sequentially disposed in a radial direction, a stator disposed between the inner rotor and the outer rotor, and a variable reluctance core. The variable reluctance core is configured to vary a magnetic-path formed state of the stator according to physical displacement thereof.

The stator may include inner teeth protruding toward the inner rotor and outer teeth protruding toward the outer rotor. The inner teeth and the outer teeth may be aligned with each other in the radial direction. The variable reluctance core may be disposed between the inner teeth and the outer teeth.

The variable reluctance core may be mounted between the inner teeth and the outer teeth of the stator so as to vary the magnetic-path formed state of the stator according to rotational displacement thereof in the circumferential direction of the stator.

The variable reluctance core may be formed in a ring shape, and may include stacked portions, each of which is formed by stacking a plurality of weak magnetic plates. The stacked portions may be disposed so as to be spaced apart from each other at regular intervals in the circumferential direction.

Each of the stacked portions may be formed such that a plurality of grain-oriented steel sheets is stacked so as to minimize reluctance between the inner teeth and the outer teeth of the stator.

The stator may include outer slots formed between the outer teeth and inner slots formed between the inner teeth. The variable reluctance core may be configured to vary the magnetic-path formed state of the stator as the stacked portions move between first spaces defined between the outer slots and the inner slots in the stator and second spaces defined between the outer teeth and the inner teeth.

Each of the stacked portions of the variable reluctance core may be formed to have the same width as the width of each of the second spaces in the radial direction. Each of the first spaces may be formed to have a width larger than the width of each of the second spaces in the radial direction.

Each of the first spaces may be provided with a recessed portion recessed in a radially inward direction relative to each of the second spaces so as to have a width larger than the width of each of the second spaces in the radial direction. When the stacked portions of the variable reluctance core are located in the first spaces, a space may be defined between each of the stacked portions and a corresponding one of the inner teeth due to the recessed portion.

The inner teeth of the stator may be provided with teeth protrusions that protrude in a radially outward direction in order to define the second spaces. The teeth protrusions may be formed so as to be spaced apart from the stacked portions of the variable reluctance core in the circumferential direction when the stacked portions are centrally aligned with the first spaces in the circumferential direction.

The variable reluctance core may be provided with a ring gear concentric with the variable reluctance core. The ring gear may be engaged with a pinion configured to be rotated by an actuator.

The variable reluctance core may include non-magnetic portions provided between the stacked portions disposed in the circumferential direction of the ring gear.

The non-magnetic portions of the variable reluctance core may be spaces defined between the stacked portions.

The actuator may be mounted so as to be controlled by a controller configured to control the motor. The controller may be configured to control the actuator such that the stacked portions of the variable reluctance core are located in the first spaces when the inner rotor and the outer rotor rotate independently of each other. The controller may also be configured to control the actuator such that the stacked portions of the variable reluctance core are located in the second spaces when the inner rotor and the outer rotor rotate at the same speed.

The variable reluctance core may be configured such that the stacked portions connect magnetic paths between the inner teeth and the outer teeth aligned with each other in the radial direction of the stator when the inner rotor and the outer rotor rotate at the same speed.

The variable reluctance core may be configured such that the stacked portions are located between the inner slots and the outer slots aligned with each other in the radial direction of the stator when the inner rotor and the outer rotor rotate independently of each other. The stator may include spaces defined therein so as to interrupt connection of magnetic paths between the inner slots and the outer slots when the stacked portions are located between the inner slots and the outer slots.

BRIEF DESCRIPTION OF THE DRAWINGS

The above and other objects, features, and other advantages of the present disclosure should be more clearly understood from the following detailed description taken in conjunction with the accompanying drawings, in which.

DETAILED DESCRIPTION OF EMBODIMENTS

Figure 1:
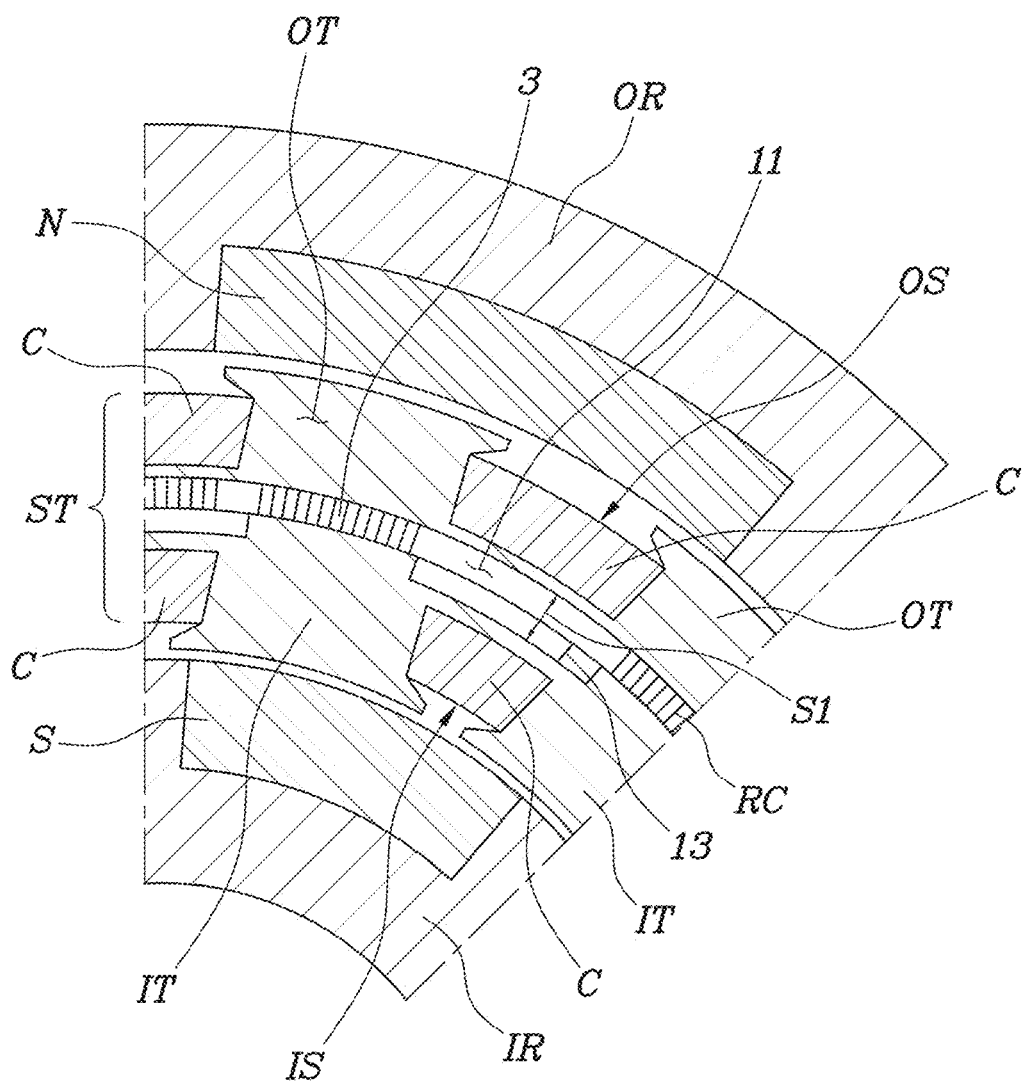
FIG. 1 is a view showing the structure of a dual-rotor motor according to the present disclosure.

Hereinafter, the embodiments disclosed in the present specification are described in detail with reference to the accompanying drawings. The same or similar elements are denoted by the same reference numerals even though they are depicted in different drawings, and redundant descriptions thereof have been omitted.

In the following description, with respect to constituent elements used in the following description, the suffixes "module" and "unit" are used only in consideration of facilitating the description, and do not have mutually distinguished meanings or functions.

In the following description of the embodiments disclosed in the present specification, a detailed description of known functions and configurations incorporated herein has been omitted where the same may make the subject matter of the embodiments disclosed in the present specification rather unclear. In addition, the accompanying drawings are provided only for a better understanding of the embodiments disclosed in the present specification and are not intended to limit the technical ideas disclosed in the present specification. Therefore, it should be understood that the accompanying drawings include all modifications, equivalents, and substitutions within the scope and sprit of the present disclosure.

It should be understood that, although the terms "first", "second", etc., may be used herein to describe various components, these components should not be limited by these terms. These terms are only used to distinguish one component from another component.

It should be understood that, when a component is referred to as being "connected to" or "coupled to" another component, the component may be directly connected to or coupled to another component, or intervening components may be present. On the other hand, when a component is referred to as being "directly connected to" or "directly coupled to" another component, there are no intervening components present.

As used herein, singular forms are intended to include the plural forms as well, unless the context clearly indicates otherwise.

It should be further understood that the terms "comprises", "comprising", "includes", "has", "having", "includes", and/or "including" and variations thereof, when used herein, specify the presence of stated features, integers, steps, operations, elements, components, or combinations thereof. The terms do not preclude the presence or addition of one or more other features, integers, steps, operations, elements, components, or combinations thereof.

Referring to FIGS. 1-6, a dual-rotor motor according to an embodiment of the present disclosure includes an inner rotor IR and an outer rotor OR, which are sequentially disposed in a radial direction. The dual-rotor motor also includes a stator ST, which is disposed between the inner rotor IR and the outer rotor OR. The dual-rotor motor also includes a variable reluctance core RC, which is configured to vary the magnetic-path formed state of the stator ST according to physical displacement thereof.

The radial direction is a radial direction defined about the axis of rotation of the motor.

When the inner rotor IR and the outer rotor OR rotate independently of each other, the variable reluctance core RC interrupts connection of magnetic paths between the outer side and the inner side of the stator ST. When the inner rotor IR and the outer rotor OR rotate at the same speed, the variable reluctance core RC connects magnetic paths between the outer side and the inner side of the stator ST.

In other words, the dual-rotor motor of the present disclosure is configured such that the state of connection of magnetic paths between the inner side and the outer side of the stator ST is varied by the variable reluctance core RC. In detail, when the inner rotor IR and the outer rotor OR rotate independently of each other, the variable reluctance core RC interrupts connection of magnetic paths between the outer side and the inner side of the stator ST. Thus, the magnetic path formed by the stator ST and the outer rotor OR and the magnetic path formed by the stator ST and the inner rotor IR are independent of each other.

On the other hand, when the inner rotor IR and the outer rotor OR rotate at the same speed, the variable reluctance core RC connects magnetic paths between the inner side and the outer side of the stator ST to form an integrated magnetic path. Accordingly, the overall length of the magnetic paths formed between the stator ST, the inner rotor IR, and the outer rotor OR may be reduced, reluctance may be reduced, and consequently, the torque density of the motor may be improved.

Permanent magnets are disposed in the inner rotor IR and the outer rotor OR. In the drawings, two magnetic poles of each permanent magnet are denoted by "N" and "S".

The stator ST includes inner teeth IT protruding toward the inner rotor IR and outer teeth OT protruding toward the outer rotor OR. The inner teeth IT and the outer teeth OT are aligned with each other in the radial direction. The variable reluctance core RC is disposed between the inner teeth IT and the outer teeth OT.

In other words, the variable reluctance core RC is mounted between the inner teeth IT and the outer teeth OT of the stator ST. Thus, the magnetic-path formed state of the stator ST is varied according to the rotational displacement thereof in the circumferential direction of the stator ST.

The variable reluctance core RC is formed in a ring shape, and includes stacked portions 3, each of which is formed by stacking a plurality of weak magnetic plates 1. The stacked portions 3 are disposed so as to be spaced apart from each other at regular intervals in the circumferential direction.

For example, each of the stacked portions 3 may be formed such that a plurality of grain-oriented silicon steel sheets is stacked. Thus, reluctance is minimized between the inner teeth IT and the outer teeth OT of the stator ST.

Figure 6:
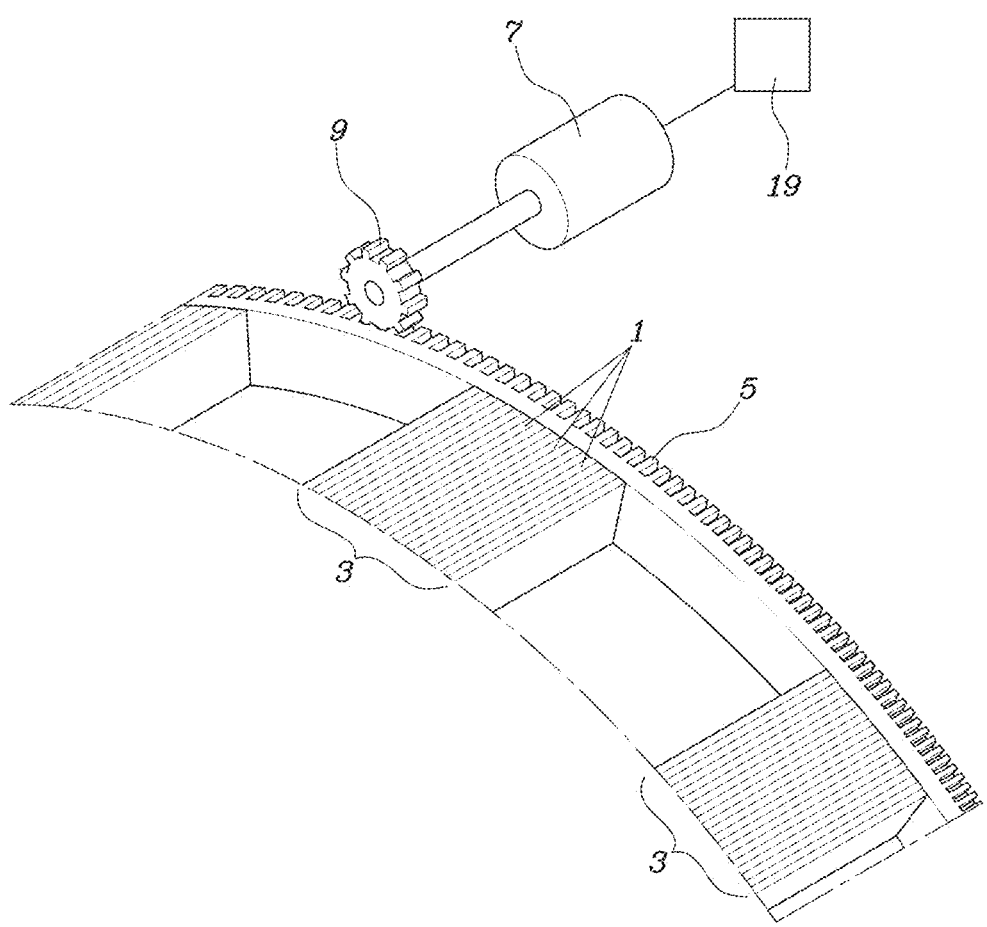
FIG. 6 is a view showing an example in which non-magnetic portions of the variable reluctance core are spaces.

In other words, the grain-oriented silicon steel sheets are the weak magnetic plates 1. As illustrated in FIG. 6, a plurality of grain-oriented silicon steel sheets is stacked in the circumferential direction of the variable reluctance core RC to form each of the stacked portions 3.

The variable reluctance core RC is provided with a ring gear 5 concentric with the core RC. A pinion 9, which is rotated by an actuator 7, is engaged with the ring gear 5.

Therefore, when the actuator 7 rotates the pinion 9, the ring gear 5 is rotated, whereby the variable reluctance core RC rotates relative to the stator ST.

The variable reluctance core RC includes non-magnetic portions 11 provided between the stacked portions 3 disposed in the circumferential direction of the ring gear 5.

The non-magnetic portions 11 of the variable reluctance core RC may be spaces defined between the stacked portions 3 or may be made of plastic resin or the like. In this embodiment, the non-magnetic portions 11 are spaces.

The stator ST includes outer slots OS formed between the outer teeth OT and inner slots IS formed between the inner teeth IT. The variable reluctance core RC varies the magnetic-path formed state of the stator ST as the stacked portions 3 move between first spaces S1 defined between the outer slots OS and the inner slots IS in the stator ST and second spaces S2 defined between the outer teeth OT and the inner teeth IT of the stator ST.

Here, each of the stacked portions 3 of the variable reluctance core RC is formed to have the same width as the width of each of the second spaces S2 in the radial direction. Each of the first spaces S1 is formed to have a width larger than the width of each of the second spaces S2 in the radial direction.

For reference, the configuration in which each of the stacked portions 3 has the same width as the width of each of the second spaces S2 in the radial direction means that almost no gap is formed between the inner teeth IT of the stator ST and the stacked portions 3 and between the outer teeth OT of the stator ST and the stacked portions 3 when the stacked portions 3 are inserted into the second spaces S2. However, in practice, since the stacked portions 3 need to rotate between the first spaces S1 and the second spaces S2 in a reciprocating manner, each of the stacked portions 3 has a width slightly smaller than the width of each of the second spaces S2 in the radial direction.

For example, FIG. 1 shows a state in which the stacked portions 3 of the variable reluctance core RC are inserted into the second spaces S2. In this state, a magnetic path passing through the inner teeth IT and a magnetic path passing through the outer teeth OT are connected to each other, as indicated by the arrows in FIG. 3. In this way, when the magnetic paths passing through the inner teeth IT and the outer teeth OT are connected to each other, the overall length of the magnetic paths is reduced compared to when the magnetic path formed between the stator ST and the inner rotor IR and the magnetic path formed between the stator ST and the outer rotor OR form closed magnetic paths independently of each other, whereby reluctance is reduced. Consequently, the torque density of the motor is improved.

Meanwhile, each of the first spaces S1 is provided with a recessed portion 13 recessed in a radially inward direction relative to each of the second spaces S2. Thus, each of the first spaces S1 has a width larger than the width of each of the second spaces S2 in the radial direction. When the stacked portions 3 of the variable reluctance core RC are located in the first spaces S1, a space is defined between each of the stacked portions 3 and a corresponding one of the inner teeth IT due to the recessed portion 13.

Figure 2:
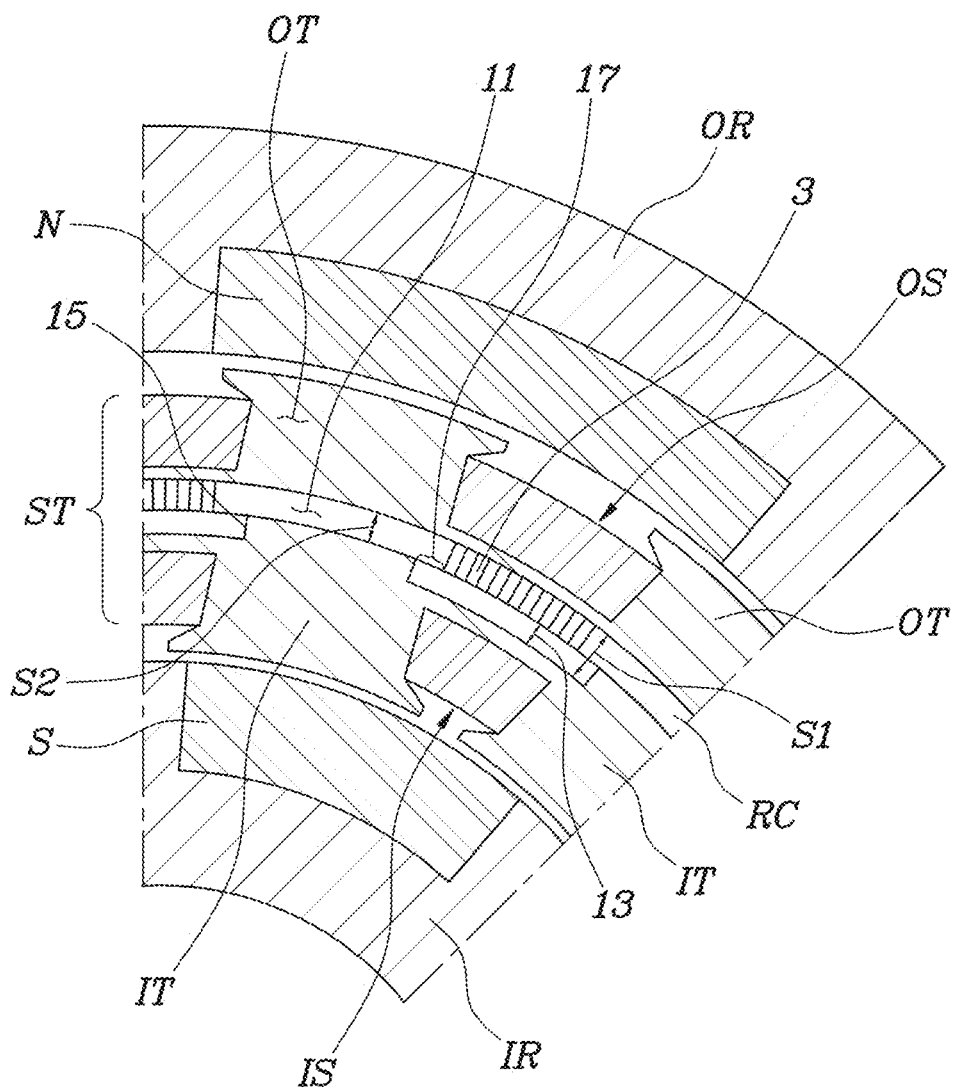
FIG. 2 is a view showing relative rotation of a variable reluctance core of the dual-rotor motor shown in FIG. 1.
Figure 3:
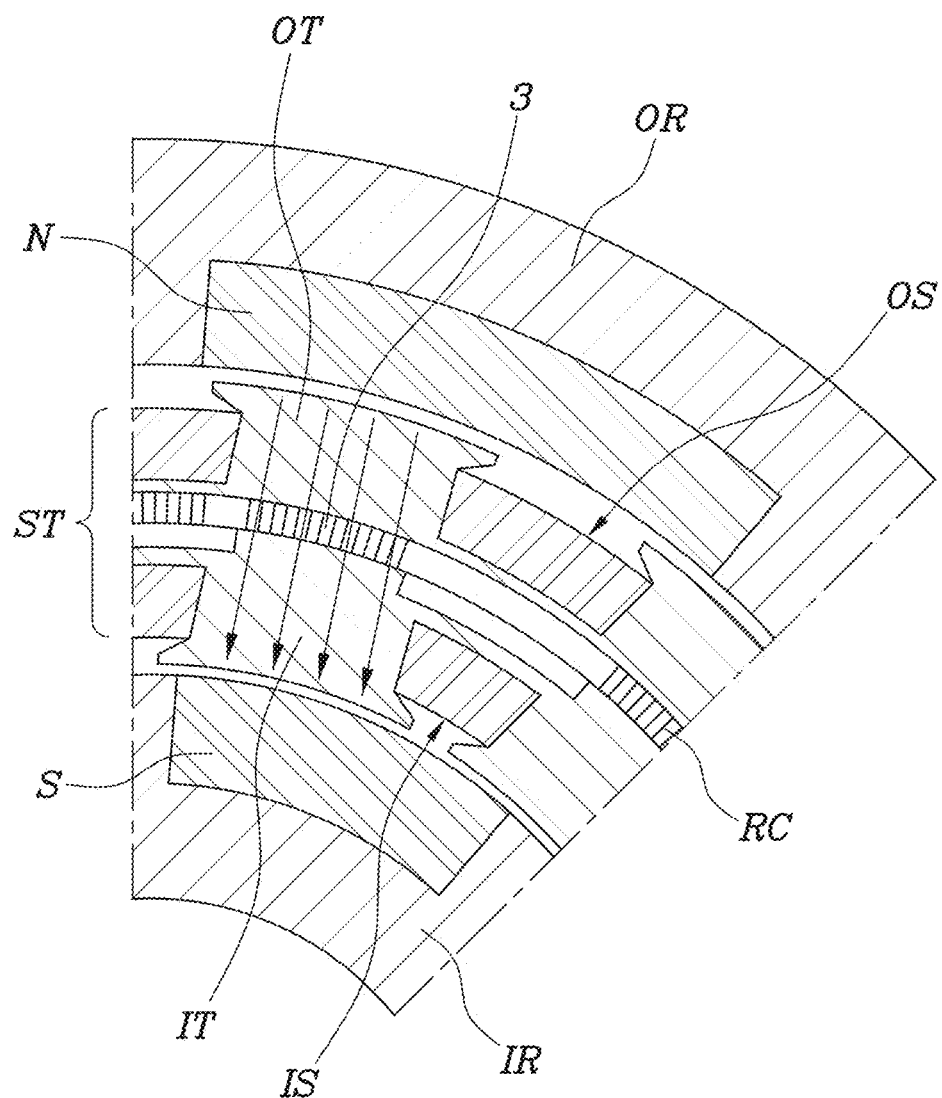
FIG. 3 is a view for explaining connection of magnetic paths between outer teeth and inner teeth through stacked portions in the dual-rotor motor shown in FIG. 1.
Figure 4:
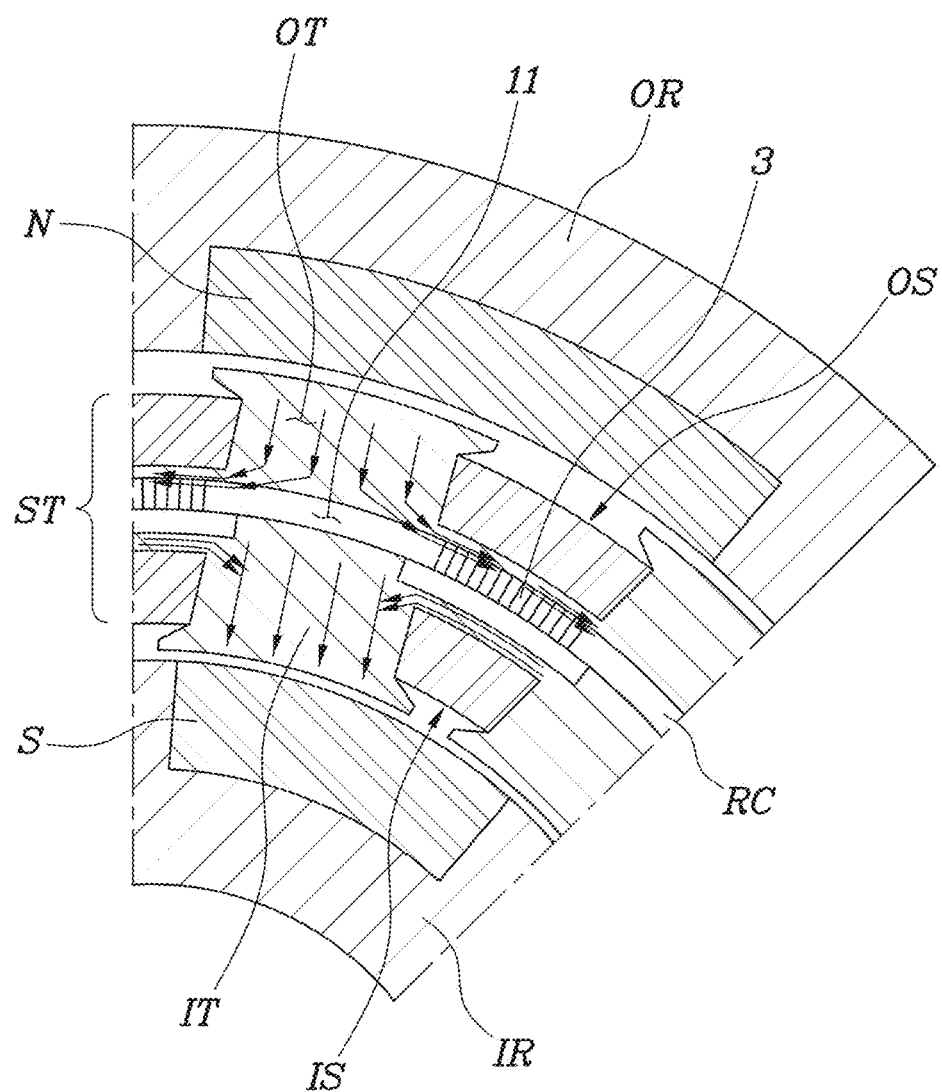
FIG. 4 is a view for explaining interruption of connection of magnetic paths between the outer teeth and the inner teeth in the dual-rotor motor shown in FIG. 2.
Figure 5:
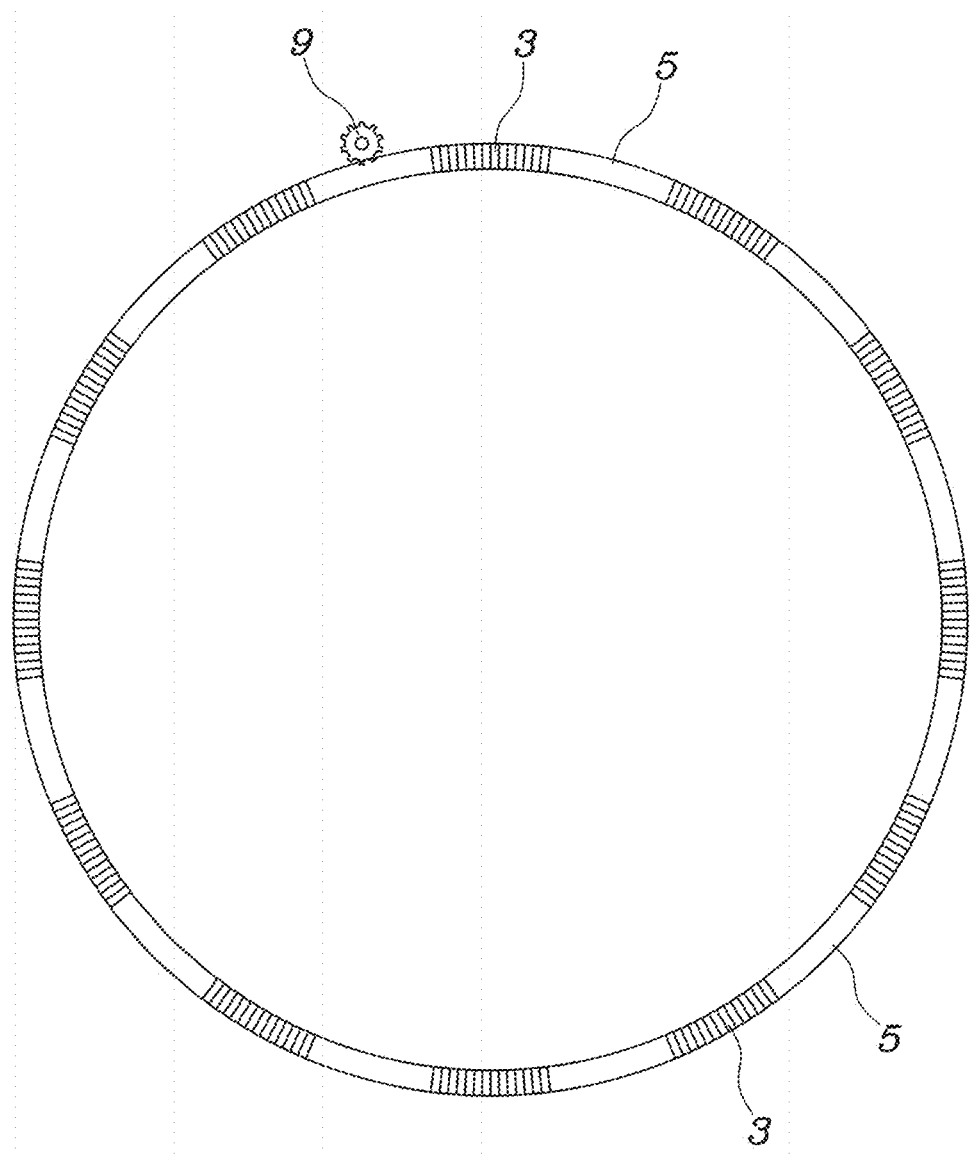
FIG. 5 is a view illustrating the variable reluctance core shown in FIG. 1.

Therefore, as shown in FIG. 2, when the stacked portions 3 are located in the first spaces S1, connection of the magnetic paths between the inner teeth IT and the outer teeth OT is interrupted by the second spaces S2, and connection of the magnetic paths between the inner slots IS and the outer slots OS is also interrupted, as indicated by the arrows in FIG. 4. As a result, the inner rotor IR and the outer rotor OR are driven reliably and independently from each other.

In other words, when the inner rotor IR and the outer rotor OR rotate independently of each other, the stacked portions 3 of the variable reluctance core RC are located between the inner slots IS and the outer slots OS, which are aligned with each other in the radial direction of the stator ST. Even when the stacked portions 3 of the variable reluctance core RC are located between the inner slots IS and the outer slots OS in the stator ST, connection of magnetic paths between the inner side and the outer side of the stator ST is interrupted by the recessed portions 13 in the first spaces S1.

Coils C are wound in the outer slots OS and the inner slots IS in the stator ST.

The inner teeth IT of the stator ST are provided with teeth protrusions 15 protruding in the radially outward direction in order to define the second spaces S2. The teeth protrusions 15 are formed so as to be spaced apart from the stacked portions 3 of the variable reluctance core RC in the circumferential direction when the stacked portions 3 are centrally aligned with the first spaces S1 in the circumferential direction.

Therefore, as shown in FIG. 2, when the stacked portions 3 of the variable reluctance core RC are centrally aligned with the first spaces S1 in the circumferential direction, the recessed portions 13 in the first spaces S1 and the second spaces S2 communicate with each other through circumferential gaps 17. This configuration causes the magnetic path formed on the inner side of the stator ST and the magnetic path formed on the outer side of the stator ST to be completely isolated from each other.

The actuator 7 is mounted so as to be controlled by a controller 19 configured to control the motor. When the inner rotor IR and the outer rotor OR rotate independently of each other, the controller 19 controls the actuator 7 such that the stacked portions 3 of the variable reluctance core RC are located in the first spaces S1. When the inner rotor IR and the outer rotor OR rotate at the same speed, the controller 19 controls the actuator 7 such that the stacked portions 3 of the variable reluctance core RC are located in the second spaces S2.

In other words, when the inner rotor IR and the outer rotor OR rotate at the same speed, the stacked portions 3 of the variable reluctance core RC connect magnetic paths between the inner teeth IT and the outer teeth OT, which are aligned with each other in the radial direction of the stator ST.

When the inner rotor IR and the outer rotor OR rotate independently of each other, the stacked portions 3 of the variable reluctance core RC are located between the inner slots IS and the outer slots OS, which are aligned with each other in the radial direction of the stator ST. When the stacked portions 3 are located between the inner slots IS and the outer slots OS, the recessed portions 13 in the stator ST function as spaces that interrupt connection of magnetic paths between the inner slots IS and the outer slots OS.

As is apparent from the above description, the present disclosure provides a dual-rotor motor capable of varying the state of connection of magnetic paths thereof in order to reduce reluctance and increase inductance when an inner rotor and an outer rotor rotate at the same speed. This improves the torque density thereof. Accordingly, the overall length and volume of the motor may be reduced. Thus, mountability of the motor in a vehicle may be improved. In addition, the number of permanent magnets and the number of grain-oriented silicon steel sheets to be used in fabricating the motor may be reduced. Thus, the cost of manufacturing the motor may be reduced.

In addition, the motor of the present disclosure may increase reluctance at a low-torque operating point to reduce iron loss. Also, the motor may reduce reluctance at a high-torque operating point to reduce copper loss.

Although the embodiments of the present disclosure have been disclosed for illustrative purposes, those of ordinary skill in the art should appreciate that various modifications, additions, and substitutions are possible, without departing from the scope and spirit of the present disclosure as set forth in the accompanying claims.

What is claimed is:

1. A dual-rotor motor comprising:
   an inner rotor and an outer rotor sequentially disposed in a radial direction;
   a stator disposed between the inner rotor and the outer rotor; and
   a variable reluctance core configured to vary a magnetic-path formed state of the stator according to physical displacement thereof,
   wherein the stator includes inner teeth protruding toward the inner rotor and outer teeth protruding toward the outer rotor,
   wherein the inner teeth and the outer teeth are aligned with each other in the radial direction, and
   wherein the inner teeth, the variable reluctance core, and the outer teeth are sequentially arranged along a radial direction.

2. The dual-rotor motor according to claim 1, wherein the variable reluctance core is mounted between the inner teeth and the outer teeth of the stator so as to vary the magnetic-path formed state of the stator according to rotational displacement thereof in a circumferential direction of the stator.

3. The dual-rotor motor according to claim 2, wherein the variable reluctance core is ring shaped and comprises stacked portions, and wherein each of the stacked portions is a plurality of weak magnetic plates, and the stacked portions are disposed so as to be spaced apart from each other at regular intervals in the circumferential direction.

4. The dual-rotor motor according to claim 3, wherein each of the stacked portions is formed such that a plurality of grain-oriented steel sheets is stacked so as to minimize reluctance between the inner teeth and the outer teeth of the stator.

5. The dual-rotor motor according to claim 4, wherein the stator comprises outer slots formed between the outer teeth and inner slots formed between the inner teeth, and
   the variable reluctance core is configured to vary the magnetic-path formed state of the stator as the stacked portions move between first spaces defined between the outer slots and the inner slots in the stator and second spaces defined between the outer teeth and the inner teeth.

6. The dual-rotor motor according to claim 5, wherein each of the stacked portions of the variable reluctance core has a width that is the same as a width of each of the second spaces in the radial direction, and each of the first spaces has a width larger than the width of each of the second spaces in the radial direction.

7. The dual-rotor motor according to claim 6, wherein each of the first spaces is provided with a recessed portion recessed in a radially inward direction relative to each of the second spaces so as to have a width larger than the width of each of the second spaces in the radial direction, and
   when the stacked portions of the variable reluctance core are located in the first spaces, a space is defined between each of the stacked portions and a corresponding one of the inner teeth due to the recessed portion.

8. The dual-rotor motor according to claim 7, wherein the inner teeth of the stator are provided with teeth protrusions that protrude in a radially outward direction in order to define the second spaces, and
   the teeth protrusions are spaced apart from the stacked portions of the variable reluctance core in the circumferential direction when the stacked portions are centrally aligned with the first spaces in the circumferential direction.

9. The dual-rotor motor according to claim 5, wherein the variable reluctance core is provided with a ring gear concentric therewith, and
   the ring gear is engaged with a pinion configured to be rotated by an actuator.

10. The dual-rotor motor according to claim 9, wherein the variable reluctance core comprises non-magnetic portions provided between the stacked portions disposed in a circumferential direction of the ring gear.

11. The dual-rotor motor according to claim 9, wherein the non-magnetic portions of the variable reluctance core are spaces defined between the stacked portions.

12. The dual-rotor motor according to claim 9, wherein the actuator is mounted so as to be controlled by a controller configured to control the motor, and
    the controller is configured to control the actuator such that the stacked portions of the variable reluctance core are located in the first spaces when the inner rotor and the outer rotor rotate independently of each other and to control the actuator such that the stacked portions of the variable reluctance core are located in the second spaces when the inner rotor and the outer rotor rotate at a same speed.

13. The dual-rotor motor according to claim 5, wherein the variable reluctance core is configured such that the stacked portions are located between the inner slots and the outer slots aligned with each other in a radial direction of the stator when the inner rotor and the outer rotor rotate independently of each other, and
    the stator comprises spaces defined therein so as to interrupt connection of magnetic paths between the inner slots and the outer slots when the stacked portions are located between the inner slots and the outer slots.

14. The dual-rotor motor according to claim 3, wherein the variable reluctance core is configured such that the stacked portions connect magnetic paths between the inner teeth and the outer teeth aligned with each other in a radial direction of the stator when the inner rotor and the outer rotor rotate at a same speed.

* * * * *